(12) United States Patent
Freimuth et al.

(10) Patent No.: US 9,311,128 B2
(45) Date of Patent: *Apr. 12, 2016

(54) BANDWIDTH-EFFICIENT VIRTUAL MACHINE IMAGE DELIVERY OVER DISTRIBUTED NODES BASED ON PRIORITY AND HISTORICAL ACCESS CRITERIA

(71) Applicant: International Business Machines Corporation, Armonk, NY (US)

(72) Inventors: Douglas M. Freimuth, New York, NY (US); Ho Yin Starsky Wong, Ossining, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/956,801

(22) Filed: Aug. 1, 2013

(65) Prior Publication Data
US 2014/0325507 A1 Oct. 30, 2014

Related U.S. Application Data

(63) Continuation of application No. 13/873,337, filed on Apr. 30, 2013.

(51) Int. Cl.
G06F 9/455 (2006.01)
G06F 11/14 (2006.01)
G06F 17/30 (2006.01)

(52) U.S. Cl.
CPC ............ *G06F 9/45558* (2013.01); *G06F 11/14* (2013.01); *G06F 17/30* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 2002/0147815 A1* | 10/2002 | Tormasov | G06F 17/30209 709/226 |
| 2006/0047855 A1 | 3/2006 | Gurevich et al. | |
| 2008/0307414 A1 | 12/2008 | Alpern et al. | |
| 2010/0064141 A1 | 3/2010 | Manasse et al. | |
| 2010/0275200 A1 | 10/2010 | Radhakrishnan et al. | |
| 2011/0113012 A1 | 5/2011 | Gruhl et al. | |
| 2011/0219372 A1* | 9/2011 | Agrawal | G06F 9/45558 718/1 |
| 2012/0240110 A1 | 9/2012 | Breitgand et al. | |

(Continued)

OTHER PUBLICATIONS

Harney, Eric et al., "The Efficacy of Live Virtual Machine Migrations Over the Internet", VTDC'07, Reno, Nevada, Nov. 12, 2007, 7 pages.

(Continued)

*Primary Examiner* — Benjamin Wu
(74) *Attorney, Agent, or Firm* — Francis Lammes; Stephen J. Walder, Jr.; Mercedes L. Hobson

(57) ABSTRACT

A mechanism is provided for bandwidth-efficient virtual machine image delivery. Responsive to a request to generate a virtual machine (VM) in a node using an existing virtual machine image (VMI) file, a set of file chunks that constitute the VMI file is identified. The set of file chunks are retrieved from within a set of distributed nodes by establishing an optimized plan for retrieving the set of file chunks in a bandwidth-efficient manner. Responsive to retrieving the set of file chunks from within the distributed nodes, the set of file chunks are reassembled into the VMI file for generation of the VM.

7 Claims, 6 Drawing Sheets

(56) References Cited

U.S. PATENT DOCUMENTS

| | | | |
|---|---|---|---|
| 2012/0243795 A1* | 9/2012 | Head | H04N 19/507 382/218 |
| 2012/0311575 A1 | 12/2012 | Song | |
| 2013/0305046 A1* | 11/2013 | Mankovski | G06F 21/62 713/168 |
| 2014/0095816 A1* | 4/2014 | Hsu | G06F 3/0655 711/162 |
| 2014/0095817 A1* | 4/2014 | Hsu | G06F 11/1438 711/162 |
| 2014/0115098 A1* | 4/2014 | Reich | H04N 21/4334 709/217 |
| 2014/0156866 A1* | 6/2014 | Kallstrom | H04L 67/06 709/232 |
| 2014/0229440 A1* | 8/2014 | Venkatesh | G06F 17/30174 707/634 |
| 2014/0280433 A1* | 9/2014 | Messerli | H04L 67/06 709/201 |

OTHER PUBLICATIONS

Peng, Chunyi et al., "VDN: Virtual Machine Image Distribution Network for Cloud Data Centers", http://www.cs.ucla.edu/~chunyip/publications/infocom12-vdn-peng.pdf, IEEE Proceedings of INFOCOM, 2012, Mar. 25-30, 2012, pp. 181-189.

Schwarzkopf, Roland et al., "Efficient Storage of Virtual Machine Images", ScienceCloud'12, Delft, The Netherlands, Jun. 18, 2012, pp. 51-60.

Wei, Jinpng et al., "Managing Security of Virtual Machine Images in a Cloud Environment", CCSW'09, Chicago, Illinois, Nov. 13, 2009, pp. 91-96.

U.S. Appl. No. 13/873,337.

* cited by examiner

BANDWIDTH-EFFICIENT VIRTUAL MACHINE IMAGE DELIVERY OVER DISTRIBUTED NODES BASED ON PRIORITY AND HISTORICAL ACCESS CRITERIA

BACKGROUND

The present application relates generally to an improved data processing apparatus and method and more specifically to mechanisms for a bandwidth-efficient virtual machine image delivery.

A virtual machine (VM) is a software implementation of a machine (i.e. a computer) that executes programs like a physical machine. Virtual machines are separated into two major classifications, based on their use and degree of correspondence to any real machine:

1. A system virtual machine provides a complete system platform which supports the execution of a complete operating system. The system virtual machine usually emulates an existing architecture and is built with either the purpose of providing a platform to run programs where the real hardware is not available for use or of having multiple instances of virtual machines lead to more efficient use of computing resources, both in terms of energy consumption and cost effectiveness, or both.
2. A process virtual machine is designed to run a single program, which means that it supports a single process. Such process virtual machines are usually closely suited to one or more programming languages and built with the purpose of providing program portability and flexibility. An essential characteristic of a process virtual machine is that the software running inside is limited to the resources and abstractions provided by the virtual machine, i.e. the process cannot break out of the associated virtual environment.

Virtual Machine Images (VMIs) are utilized to create virtual machines (VMs) on a host system. That is, rather than writing the code for VM, a user may find an existing VMI that meets the user's VM requirement and utilizes that identified VMI as the bases for their VM. However, VMI are generally large files (usually ranging in size from a couple of GBytes to hundreds of GBytes) and usually exist in the realm of datacenters. Host machines (physical servers) in a datacenter usually access VMIs through a file system, with the file-system being mounted on a local disk or on a remote disk accessed through a network protocol. The VMI may be composed of an operating system (OS) image, middleware, applications, or the like.

SUMMARY

In one illustrative embodiment, a method, in a data processing system, is provided for bandwidth-efficient virtual machine image delivery. The illustrative embodiment identifies a set of file chunks that constitute a VMI file in response to a request to generate a virtual machine (VM) in a node using an existing virtual machine image (VMI) file. The illustrative embodiment retrieves the set of file chunks from within a set of distributed nodes. In the illustrative embodiment, retrieving the set of file chunks from within the distributed nodes is performed by establishing an optimized plan for retrieving the set of file chunks in a bandwidth-efficient manner. The illustrative embodiment reassembles the set of file chunks into the VMI file for generation of the VM in response to retrieving the set of file chunks from within the distributed nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, Virtual Machine Images (VMIs) are utilized to create virtual machines (VMs) on a host system. That is, rather than writing the code for a VM, a user may find an existing VMI that meets the user's VM requirement and utilized that identified VMI as the bases for their VM. However, VMIs are generally large files (usually ranging in size from a couple of GBytes to hundreds of GBytes) and usually exist in the realm of datacenters. Host machines (physical servers) in datacenters usually access VMIs through a file system, with the file-system being mounted on a local disk or on a remote disk accessed through a network protocol. The VMI may be composed of an operating system (OS) image, middleware, applications, or the like.

With the increased usage of VMs, VMIs have started to appear in the realm of the whole Internet, i.e. across datacenters, at local points of presence, at the edge of the networks (wired and wireless), and even at user end devices (e.g. desktops, laptops, smart-phones, etc). In these environments, scaling the distribution of VMIs becomes highly important given their extremely large sizes, at least 1-2 orders of magnitude larger than video files. Given the limited bandwidth available across such networks, the illustrative embodiments provide for VMI delivery through a mechanism that breaks the VMIs into file chunks with chunk metadata, creates tables to manage the chunk metadata across distributed nodes, and intelligently reassembles the file chunks of the VMI at the client node. Thus, the illustrative embodiments provide for a bandwidth-efficient virtual machine image delivery.

Figure 1:
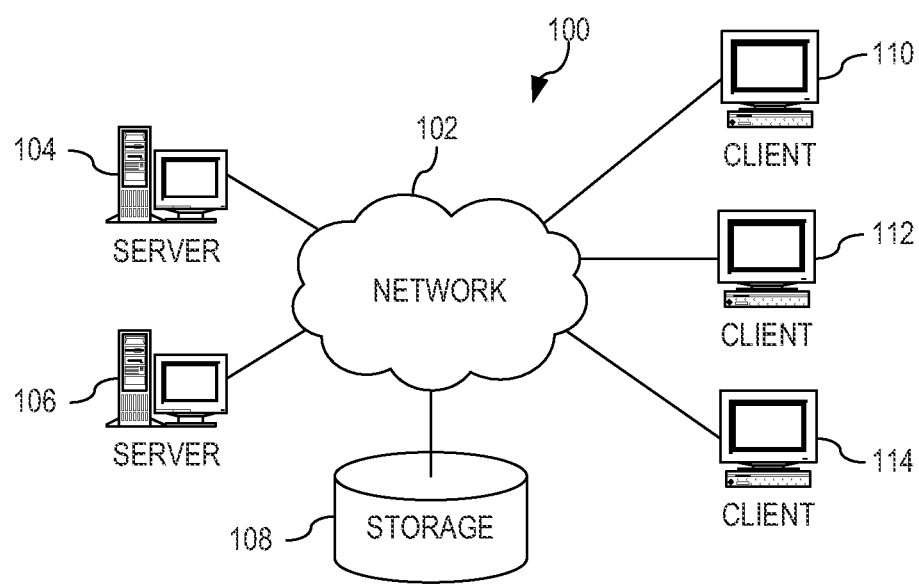
FIG. 1 depicts a pictorial representation of an example distributed data processing system in which aspects of the illustrative embodiments may be implemented.
Figure 2:
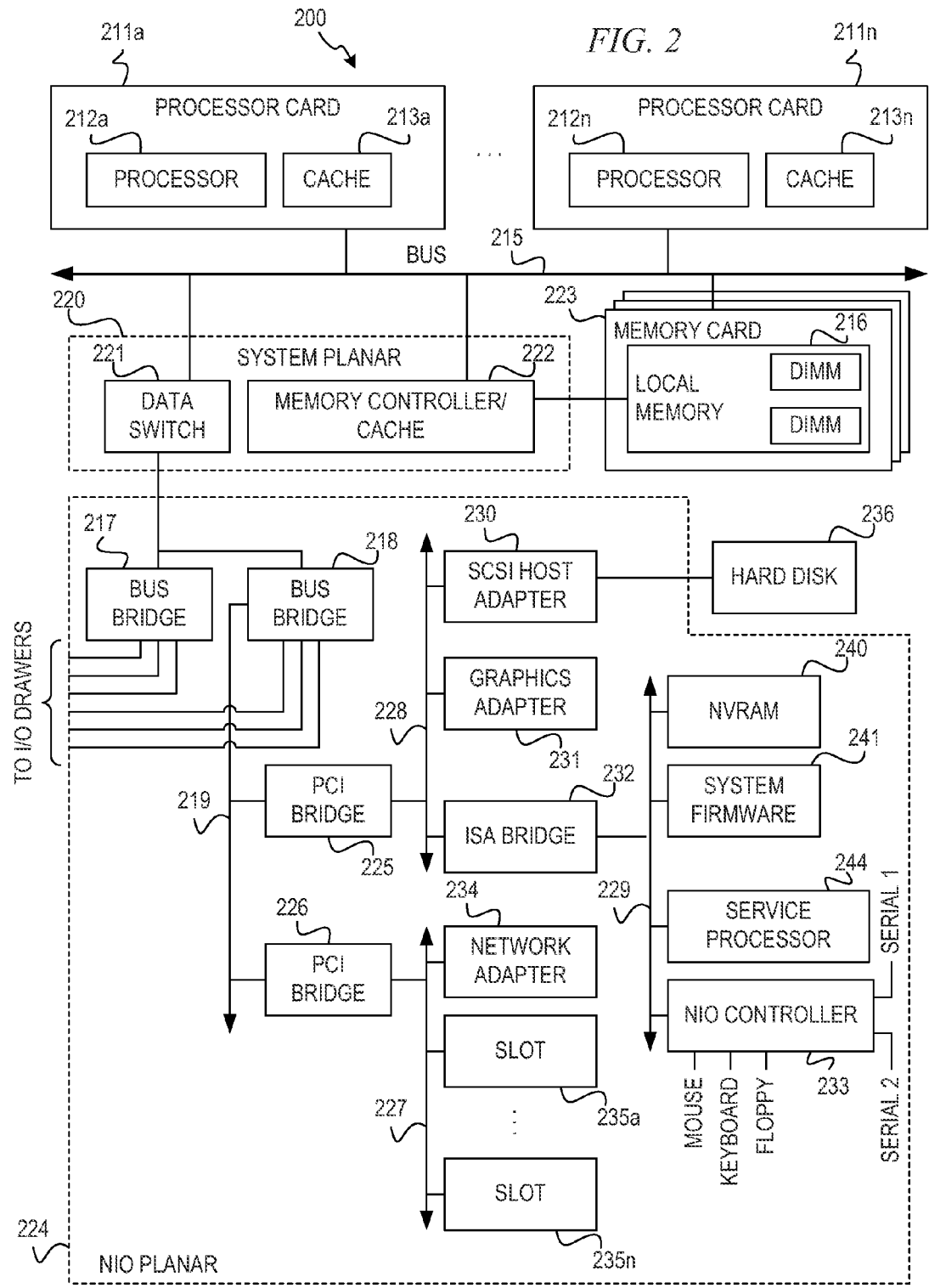
FIG. 2 depicts a block diagram of a data processing system with which aspects of the illustrative embodiments may advantageously be utilized.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 depicts a block diagram of a data processing system with which aspects of the illustrative embodiments may advantageously be utilized. As shown, data processing system 200 includes processor cards 211a-211n. Each of processor cards 211a-211n includes a processor and a cache memory. For example, processor card 211a contains processor 212a and cache memory 213a, and processor card 211n contains processor 212n and cache memory 213n.

Processor cards 211a-211n are connected to main bus 215. Main bus 215 supports a system planar 220 that contains processor cards 211a-211n and memory cards 223. The system planar also contains data switch 221 and memory controller/cache 222. Memory controller/cache 222 supports memory cards 223 that include local memory 216 having multiple dual in-line memory modules (DIMMs).

Data switch 221 connects to bus bridge 217 and bus bridge 218 located within a native I/O (NIO) planar 224. As shown, bus bridge 218 connects to peripheral components interconnect (PCI) bridges 225 and 226 via system bus 219. PCI bridge 225 connects to a variety of I/O devices via PCI bus 228. As shown, hard disk 236 may be connected to PCI bus 228 via small computer system interface (SCSI) host adapter 230. A graphics adapter 231 may be directly or indirectly connected to PCI bus 228. PCI bridge 226 provides connections for external data streams through network adapter 234 and adapter card slots 235a-235n via PCI bus 227.

An industry standard architecture (ISA) bus 229 connects to PCI bus 228 via ISA bridge 232. ISA bridge 232 provides interconnection capabilities through NIO controller 233 having serial connections Serial 1 and Serial 2. A floppy drive connection, keyboard connection, and mouse connection are provided by NIO controller 233 to allow data processing system 200 to accept data input from a user via a corresponding input device. In addition, non-volatile RAM (NVRAM) 240 provides a non-volatile memory for preserving certain types of data from system disruptions or system failures, such as power supply problems. A system firmware 241 is also connected to ISA bus 229 for implementing the initial Basic Input/Output System (BIOS) functions. A service processor 244 connects to ISA bus 229 to provide functionality for system diagnostics or system servicing.

The operating system (OS) is stored on hard disk 236, which may also provide storage for additional application software for execution by data processing system. NVRAM 240 is used to store system variables and error information for field replaceable unit (FRU) isolation. During system startup, the bootstrap program loads the operating system and initiates execution of the operating system. To load the operating system, the bootstrap program first locates an operating system kernel type from hard disk 236, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 200 may be, for example, a stand-alone system or part of a network such as a local-area network (LAN) or a wide-area network (WAN).

Figure 3:
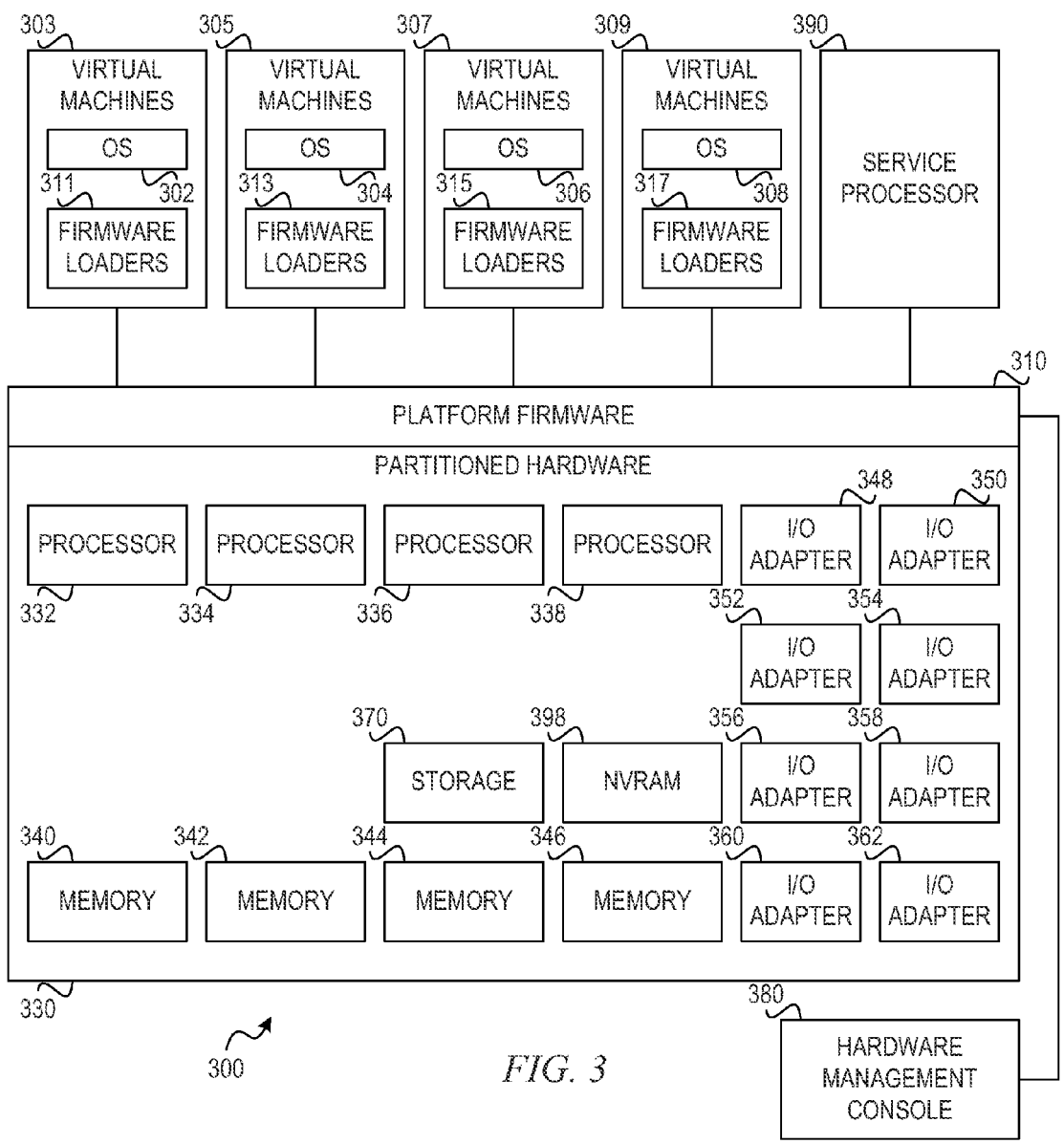
FIG. 3 is a block diagram of an exemplary virtualization platform in which exemplary aspects of the illustrative embodiments may be implemented.

FIG. 3 is a block diagram of an exemplary virtualization platform in which exemplary aspects of the illustrative embodiments may be implemented. The hardware in virtualization platform 300 may be implemented as, for example, data processing system 200 in FIG. 2. Virtualization platform 300 includes partitioned hardware 330, operating systems 302, 304, 306, 308, and firmware 310. Operating systems 302, 304, 306, and 308 may be multiple copies of a single operating system or multiple heterogeneous operating systems simultaneously run on platform 300. These operating systems may be implemented using the AIX® operating system, the i5/OS™ operating system, the Linux™ operating system, or the like, for example, which are designed to interface with server firmware. Operating systems 302, 304, 306, and 308 are located in virtual machines 303, 305, 307, and 309.

Additionally, virtual machines 303, 305, 307, and 309 also include firmware loaders 311, 313, 315, and 317. Firmware loaders 311, 313, 315, and 317 may be implemented using IEEE-1275 Standard Open Firmware and runtime abstraction software (RTAS), which is available from International Business Machines Corporation. When virtual machines 303, 305, 307, and 309 are instantiated, a copy of the open firmware is loaded into each virtual machine by the firmware's virtualization manager. The processors associated or assigned to the virtual machines are then dispatched to the virtual machine's memory to execute the virtualization firmware.

Partitioned hardware 330 includes a plurality of processors 332-338, a plurality of system memory units 340-346, a plurality of input/output (I/O) adapters 348-362, and a storage unit 370. Partitioned hardware 330 also includes service processor 390, which may be used to provide various services, such as processing of errors in the virtual machines. Each of the processors 332-338, memory units 340-346, NVRAM storage 398, and I/O adapters 348-362 may be assigned to one of multiple virtual machines within virtualization platform 300, each of which corresponds to one of operating systems 302, 304, 306, and 308.

Firmware 310 performs a number of functions and services for virtual machines 303, 305, 307, and 309 to create and enforce the virtualizing of virtualization platform 300. Firmware 310 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 310 allows the simultaneous execution of independent operating system images 302, 304, 306, and 308 by virtualizing all hardware resources of virtualization platform 300. Virtualization is the pooling of information technology resources in a way that shields the physical nature and boundaries of those resources from users.

Operations of the different virtual machines may be controlled through a hardware management console, such as hardware management console 380. Hardware management console 380 is a separate data processing system from which a system administrator may perform various functions including reallocation of resources to different virtual machines. Alternatively, a Virtual Partition Manager is a feature of the i5/OS™ V5R3 operating system that allows one to create and manage operating system logical virtual machines by initiating a console session using service tools.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system other than the SMP system mentioned previously without departing from the spirit and scope of the present invention.

In order to generate virtual machines, such as virtual machines 303, 305, 307, and 309 of FIG. 3, the illustrative embodiments utilize use of a novel metadata creation and update mechanism combined with file-chunking and re-assembly from file chunks to enable bandwidth-efficient transfer of a virtual machine image (VMI) over a network. At the first occurrence of a VMI file in a node of a distributed file system, the VMI file is chunked and a manifest is created which contains metadata on the file chunks of the VMI file. The per-VM-file metadata is then aggregated into a metadata table at the node which keeps track of chunk level information across multiple files. The metadata table has both local and global information about files in the distributed file system. The information in the metadata table is shared and periodically updated amongst other metadata tables across all the nodes in the distributed file system. When a request for a generation of a new virtual machine (VM) is received, the VM is generated utilizing a VMI that is reassembled from any local file chunks cached at the node where the VM is being generated combined with optimized file chunk requests from other nodes.

Figure 4:
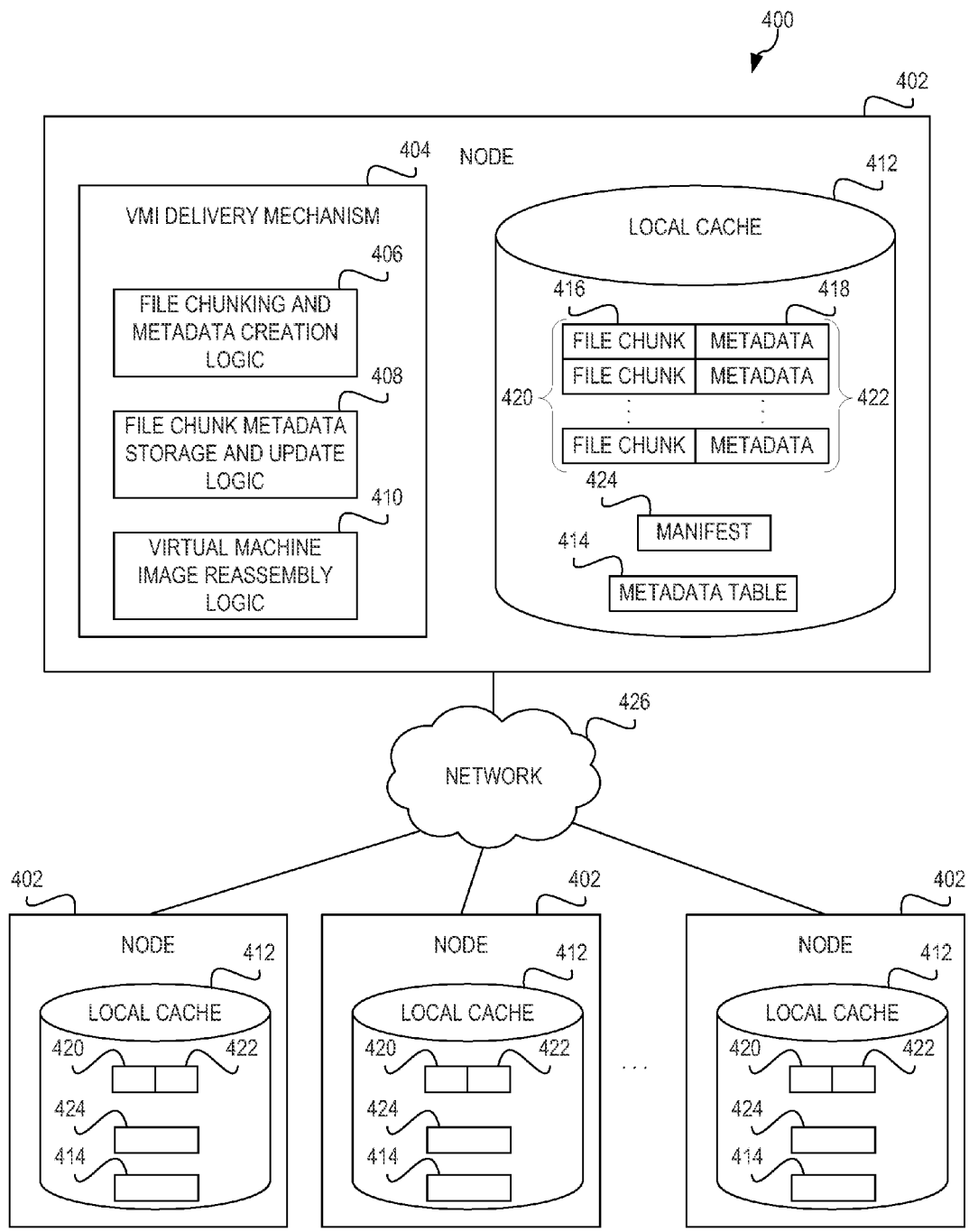
FIG. 4 depicts a virtual machine image delivery mechanism that provides for a bandwidth-efficient virtual machine image delivery in accordance with an illustrative embodiment.

FIG. 4 depicts a virtual machine image delivery mechanism that provides for a bandwidth-efficient virtual machine image delivery in accordance with an illustrative embodiment. In accordance with the illustrative embodiments, a virtual machine image (VMI) delivery mechanism, such as VMI delivery mechanism 404, exists at every node 402 in distributed file system 400 where a virtual machine (VM) may be generated. VMI delivery mechanism 404 comprises three components: file chunking and metadata creation logic 406, file chunk metadata storage and update logic 408, and virtual machine image reassembly logic 410.

When a new VMI file is generated within node 402, file chunking and metadata creation logic 406 processes the VMI file in order to divide the VMI into a collection of file chunks. File chunking and metadata creation logic 406 performs the file chunking process on the VMI file using, for example, rolling-hash based file chunking, fixed-offset based file chunking, or the like. As file chunking and metadata creation logic 406 creates each file chunk 416, file chunking and metadata creation logic 406 also creates metadata 418 that identifies the properties or characteristics of that file chunk 416. After the VMI file is divided into file chunks 420 with the associated metadata 422, file chunking and metadata creation logic 406 creates manifest 424 to represent the VMI file as a collection of metadata 422 for file chunks 420. Each file chunk 416 is represented in its respective metadata by one or more of a chunk-hash, size, start-offset in the file, original file-name where the file chunk belongs, or the like. Note that the original VMI file may or may not be actually divided into file chunks but file chunking and metadata creation logic 406 has created a collection of the file chunks 420 for the VMI file and manifest 424 to represent the VMI file as the collection of the file chunks 420 based on the metadata 422. File chunking and metadata creation logic 406 then stores the collection of file chunks 420 with the associated metadata 422 and the manifest file 424 in local cache 412.

As the process of file chunking of new VMI files may occur in any node 402 within distributed file system 400, file chunk metadata storage and update logic 408 in each other node 402 aggregates metadata 422 associated with file chunks and manifest 424 that are stored in local cache 412 into metadata table 414. Further, file chunk metadata storage and update logic 408 also communicates with other file chunk metadata storage and update logic 408 in other nodes 402 via network 426 to aggregate the metadata of the file chunks and manifest files that are stored in their local cache 412 and identified in the other metadata tables 414 into metadata table 414 thereby keeping track of file chunk level information and manifests across all the VMI files in distributed file system 400. For the file chunk level information, metadata table 414 comprises one or more of a chunk-hash, size, a list of VMI filenames where the file chunk 416 belongs, a start offset within the VMI file, a location of the file chunk 416 in distributed file system 400, or the like. Thus, each node 402 comprises its own metadata table 414 as well as file chunk metadata storage and update logic 408 that aggregates local metadata 422 for the file chunks 420 for a VMI file and manifest 424 for the VMI file into metadata table 414 as well as aggregating information for other VMI files existing in the particular node 402 and VMI files from other metadata tables 414 of other nodes 402 thereby obtaining current information on the global file chunk level metadata and manifests. File chunk metadata storage and update logic 408 may perform this level of aggregation using polling, pair-wise information exchange, centrally coordinated exchange, or the like.

Upon request for generation of a virtual machine using an existing VMI file which is in distributed file system 400, virtual machine image reassembly logic 410 first analyzes a manifest file associated with the VMI file, which is identified from metadata table 414. Again, file chunk metadata storage and update logic 408 has aggregated all manifests and metadata related to all VMI files in distributed data processing system 400. Thus, virtual machine image reassembly logic 410 is able to analyze the manifest file associated with the VMI file by identifying the associated manifest file from metadata table 414. Virtual machine image reassembly logic 410 looks at the file manifest to identify the set of file chunks that constitute the VMI file. Virtual machine image reassembly logic 410 searches its local cache 412 to identify whether one or more of the file chunks exist within local cache 412.

As would be recognizable to one of ordinary skill in the art, while VMs may differ in overall composition, one or more of the file chunks within a set of VMs may be common. For example, while three different VMs may utilize an AIX® operating system, an i5/OS™ operating system, and Linux™ operating system, respectively, all three VMs may utilize the same middleware or application programming interface (API). Thus, a file chunk for an API of the requested VMI may be obtained from local cache 412, whereas the file chunk for the operating system of the VMI may not exist in local cache 412. For those file chunks of the requested VMI that do not exist in local cache 412, virtual machine image reassembly logic 410 identifies a location of the required file chunks based on the metadata within its associated metadata table 414. In identifying a location of the required file chunks, virtual machine image reassembly logic 410 may identify that one or more of the required file chunks exist in more than one other local cache 412 of other nodes 402.

If one or more file chunks existing in multiple other local caches 412, virtual machine image reassembly logic 410 creates an optimized plan for gathering the one or more chunks existing in multiple other local caches 412. That is, if the required file chunk exists in only one other local cache 412, then virtual machine image reassembly logic 410 has to retrieve the file chunk from only that other local cache 412. However, if the file chunk exists in multiple other local caches 412, then virtual machine image reassembly logic 410 creates an optimized plan so as to retrieve the required file chunk from another local cache 412 in a bandwidth-efficient manner. Therefore, for each file chunk in the one or more file chunks existing in multiple other local caches 412, virtual machine image reassembly logic 410 chooses which other local cache 412 to retrieve the file chunk from based on one or more criteria. That criteria may include bandwidth access to the other local cache 412, historical data associated with accessing the other local cache 412, priority of accessing the other local cache 412, grouping of the file chunk with other file chunks to be retrieved from a same other local cache 412, a serial basis of how the file chunk is stored with other file chunks on the other local cache 412, access-control policies of accessing the other local cache 412, or the like.

Based on the analysis of these criteria, virtual machine image reassembly logic 410 identifies an optimal other local cache 412 to retrieve the particular file chunk from. Once an optimal plan has been chosen for each of the one or more file chunks existing in multiple other local caches 412, virtual machine image reassembly logic 410 retrieves the file chunks from its own local cache 412 and the other local caches 412 as per the optimized plan. Once all of the file chunks have been retrieved, virtual machine image reassembly logic 410 reassembles the VMI file based on the retrieved file chunks. Additionally, the virtual machine image reassembly logic 410 interacts with chunk metadata storage and update logic 408 to optionally store the retrieved file chunks in local cache 412 as well as update the metadata table 414 to indicate that the file chunks are now stored in local cache 412.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
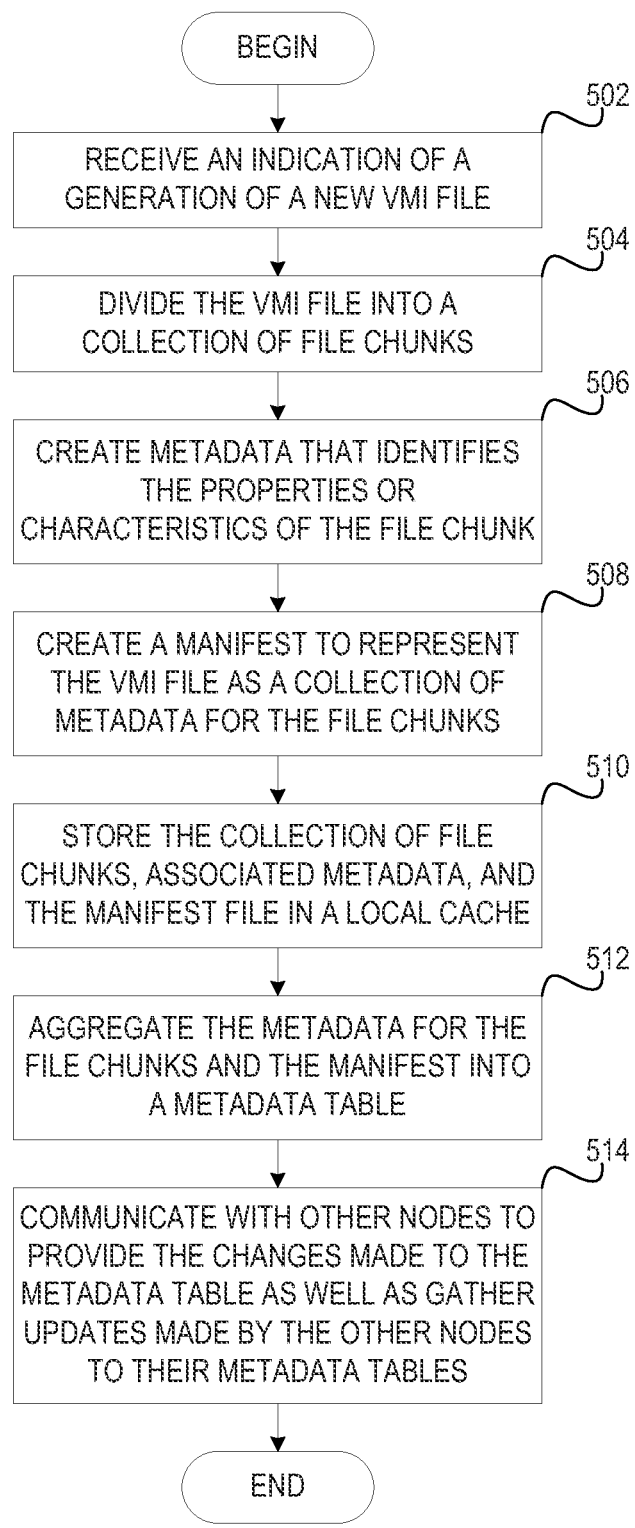
FIG. 5 depicts the operation performed by a virtual machine image (VMI) delivery mechanism in creating and recording VMI file chunks for bandwidth-efficient delivery in accordance with an illustrative embodiment.

FIG. 5 depicts the operation performed by virtual machine image (VMI) delivery mechanism in creating and recording VMI file chunks for bandwidth-efficient delivery in accordance with an illustrative embodiment. As the operation begins, the VMI delivery mechanism receives an indication of a generation of a new VMI file (step 502). The VMI delivery mechanism processes the VMI file in order to divide the VMI file into a collection of file chunks (step 504). As the VMI delivery mechanism creates each file chunk, the VMI delivery mechanism creates metadata that identifies the properties or characteristics of that file chunk (step 506). After the VMI delivery mechanism divides the VMI file into file chunks with the associated metadata, the VMI delivery mechanism creates a manifest to represent the VMI file as a collection of metadata for the file chunks (step 508). The VMI delivery mechanism then stores the collection of file chunks with the associated metadata and the manifest file in a local cache (step 510). The VMI delivery mechanism then aggregates the metadata for the file chunks and the manifest into a metadata table (step 512). The VMI delivery mechanism then communicates with other nodes to provide the changes made to the metadata table as well as gathers updates made by the other nodes to their metadata tables (step 514), with the operation ending thereafter. While step 514 is illustrated as occurring at the end of the process of creating and recording VMI file chunks for bandwidth-efficient delivery, step 514 may also occur at other times, such as on periodic time intervals, scheduled time intervals, or the like.

Figure 6:
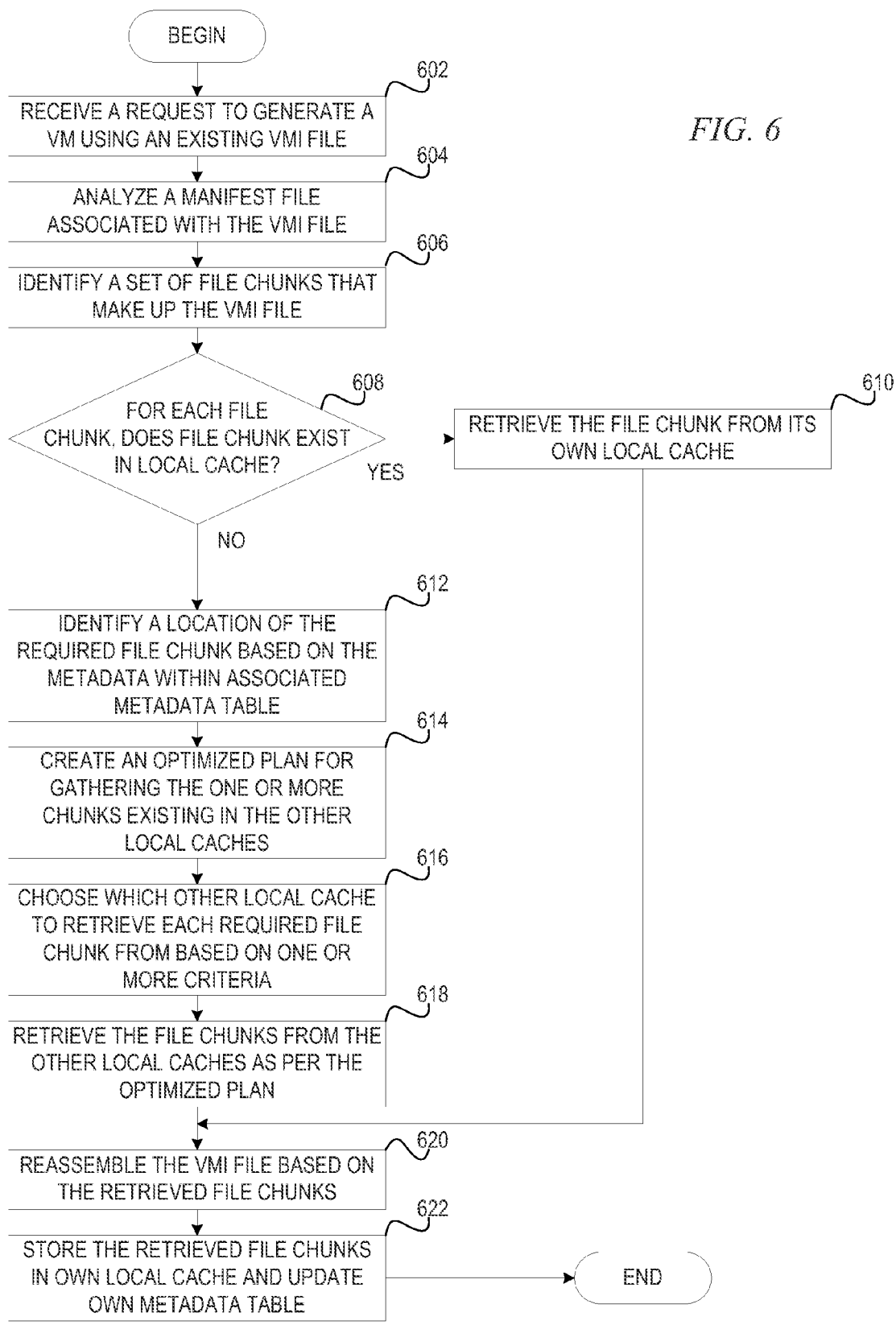
FIG. 6 depicts the operation performed by a virtual machine image (VMI) delivery mechanism in generating a VMI file from a plurality of VMI file chunks upon request for generating a virtual machine (VM) in accordance with an illustrative embodiment.

FIG. 6 depicts the operation performed by virtual machine image (VMI) delivery mechanism in generating a VMI file from a plurality of VMI file chunks upon request for generating a virtual machine (VM) in accordance with an illustrative embodiment. As the operation begins, the VMI delivery mechanism receives a request to generate a virtual machine using an existing VMI file which exists somewhere as whole or in part in a distributed file system (step 602). The VMI delivery mechanism analyzes a manifest file associated with the VMI file, which is identified from the metadata table (step 604). The VMI delivery mechanism identifies a set of file chunks that constitute the VMI file (step 606). For each identified file chunk, the VMI delivery mechanism searches its local cache to identify whether one or more of the file chunks exist within the local cache (step 608).

If at step 608 the file chunk exists in its own local cache, then the VMI delivery mechanism retrieves the file chunk from its own local cache (step 610). If at step 608 the file chunk does not exist in its own local cache, the VMI delivery mechanism identifies a location of the required file chunk based on the metadata within its associated metadata table (step 612). Upon identifying a location for all the required file chunks that exist in other local caches of other nodes, the VMI delivery mechanism creates an optimized plan for gathering the one or more chunks existing in the other local caches (step 614). That is, for each required file chunk not existing in its own local cache, the VMI delivery mechanism chooses which other local cache to retrieve each required file chunk from based on one or more criteria (step 616), The criteria including bandwidth access to the other local cache, historical data associated with accessing the other local cache, priority of accessing the other local cache, grouping of the file chunk with other file chunks to be retrieved from a same other local cache, a serial basis of how the file chunk is stored with other file chunks on the other local cache, access-control policies of accessing the other local cache, or the like. Based on the analysis of these criteria, the VMI delivery mechanism identifies an optimal other local cache to retrieve each file chunk from.

Once an optimal plan has been chosen for each of the one or more file chunks existing in the other local caches, the VMI delivery mechanism retrieves the file chunks from the other local caches as per the optimized plan (step 618). Once all of the file chunks have been retrieved from step 618 or step 610, the VMI delivery mechanism reassembles the VMI file based on the retrieved file chunks (step 620). Additionally, the VMI delivery mechanism stores the retrieved file chunks in its local cache as well as updates its metadata table to indicate the file chunks are now stored in its local cache (step 622), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a bandwidth-efficient virtual machine image delivery mechanism. At the first occurrence of a VMI file in a node of a distributed file system, the VMI file is chunked and a manifest is created which contains metadata on the file chunks of the VMI file. The per-VM-file metadata is then aggregated into a metadata table at the node which keeps track of chunk level information across multiple files. The metadata table has both local and global information about files in the distributed file system. The information in the metadata table is shared and periodically updated amongst other metadata tables across all the nodes in the distributed file system. When a request for a generation of a new virtual machine (VM) is received, the VM is generated utilizing a VMI that is reassembled from any local file chunks cached at the node where the VM is being generated combined with optimized file chunk requests from other nodes.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a set of distributed nodes, for bandwidth-efficient virtual machine image delivery, the method comprising:
   responsive to a request to generate a virtual machine (VM) in a node using an existing virtual machine image (VMI) file, identifying a set of file chunks that constitute the VMI file;
   retrieving the set of file chunks from within the set of distributed nodes, wherein retrieving the set of file chunks from within the set of distributed nodes comprises establishing an optimized plan for retrieving the set of file chunks in a bandwidth-efficient manner, wherein the optimized plan is established by the method comprising:
      for each file chunk in the set of file chunks, determining whether the file chunk exists in a local storage device;
      responsive to the file chunk existing in the local storage device, retrieving the file chunk from the local storage device; and
      responsive to the file chunk failing to exist in the local storage device;
         identifying one or more locations of the file chunk in one or more other nodes within the set of distributed nodes;
         responsive to the file chunk existing in more than one node of the one or more other nodes, identifying an optimal node to retrieve the file chunk based on a set of criteria associated with each of the more than one other node, wherein the set of criteria comprises historical data associated with accessing the node, priority of accessing the node, grouping of the file chunk with other file chunks to be retrieved from the node, and access-control policies associated with accessing file chunks in the one or more other nodes; and
         responsive to identifying an optimal node, retrieving the file chunk from a storage device associated with the optimal node; and
   responsive to retrieving the set of file chunks from within the set of distributed nodes, reassembling the set of file chunks into the VMI file for generation of the VM.

2. The method of claim 1, wherein the set of criteria further comprises bandwidth access to the node and how the file chunk is stored with other file chunks in the node.

3. The method of claim 1, wherein a location of each file chunk failing to exist in the local storage device is identified from a metadata table, wherein the metadata table comprises information about each file chunk, and wherein the information comprises one or more of a chunk-hash, a size, a start-offset in the VMI file, or original file-name where the file chunk belongs.

4. The method of claim 3, wherein a location of each file chunk failing to exist in the local storage device is identified from metadata that is aggregated into the metadata table from the one or more other nodes.

5. The method of claim 4, wherein the metadata is aggregated into the metadata table when a new VMI file is generated, at periodic intervals, or at scheduled intervals.

6. The method of claim 1, wherein the set of file chunks that constitute the VMI file are identified from a manifest file associated with the VMI file.

7. The method of claim 6, wherein the manifest file is generated in at least one of the node where the VM is being generated or another node of the one or more other nodes and wherein, responsive to the manifest file being generated in the other node of the one or more other nodes then the manifest file is aggregated into the node where the VM is being generated.

* * * * *